F. V. SCOTT AND J. D. HASKETT.
PEA HARVESTER.
APPLICATION FILED MAR. 8, 1917.
1,303,120.
Patented May 6, 1919.
2 SHEETS—SHEET 1.
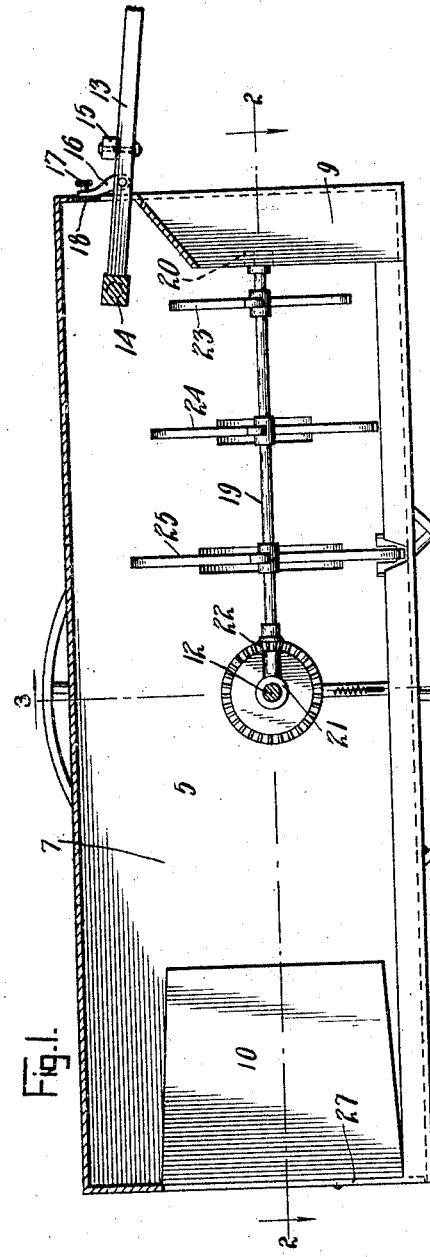
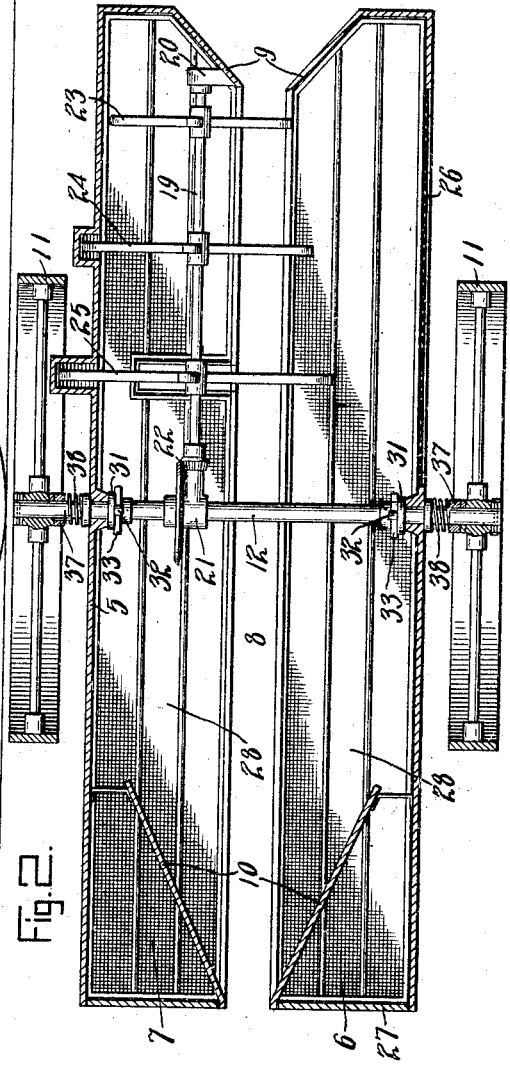

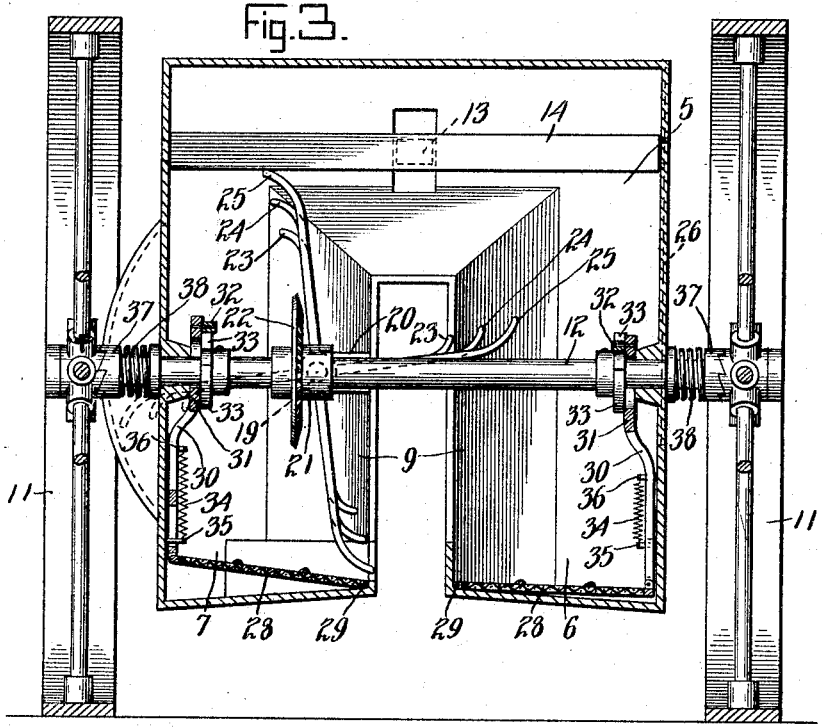

UNITED STATES PATENT OFFICE.

FRANK V. SCOTT AND JOE D. HASKETT, OF ELIZABETH CITY, NORTH CAROLINA; SAID HASKETT ASSIGNOR TO SAID SCOTT.

PEA-HARVESTER.

1,303,120. Specification of Letters Patent. Patented May 6, 1919.

Application filed March 8, 1917. Serial No. 153,362.

*To all whom it may concern:*

Be it known that we, FRANK V. SCOTT, a citizen of the United States, residing at Elizabeth City, Pasquotank county, and State of North Carolina, and JOE D. HASKETT, a citizen of the United States, residing at Elizabeth City, Pasquotank county, and State of North Carolina, have invented and discovered certain new and useful Improvements in Pea-Harvesters, of which the following is a specification.

Our said invention relates to improvements in pea harvesters, and consists in the arrangements and combinations of elements hereinafter described and particularly set forth in the accompanying claims.

The invention has for its purpose to construct a pea harvesting machine which will gather the peas from the vines with the least possible pull upon the drawing team, to the end that a greater area may be worked over than is now possible under similar conditions.

The invention has for its further purpose to produce a harvester of this type having beaters of different lengths, whereby to thresh the vines uniformly and thereby recover the maximum harvest from the crop.

The invention further contemplates to offset the location of the thresher shaft and thus enable the harvest of ranker growth without it becoming entangled in the shaft; and also to enable the beaters to pass up through the pea vines, all to the end of obtaining a harvester of easy traction.

Another object of the invention resides in the provision of a screen that is constantly agitated while the harvester moves, for the purpose of separating the peas from the leaves, or any foreign matter that is taken up in the working of the machine.

The invention is disclosed by way of illustration in the accompanying drawings, wherein—

Figure 1 is a longitudinal sectional view of the pea harvester,

Fig. 2 a horizontal sectional view thereof taken on the line 2—2 of Fig. 1,

Fig. 3 a transverse sectional view, looking forwardly, taken on the line 3—3 of Fig. 1, and Fig. 4 a detail view of the screen agitator.

Referring to the construction in further detail and wherein like reference characters designate corresponding parts, the harvester consists of a vehicle comprising a body 5 constructed in two similar sections 6 and 7 to provide a pathway 8 (see Figs. 2 and 3) running the length of the harvester and through which the pea vines pass in the traveling of the vehicle. The pea vines are gathered and directed into the pathway 8 by the entrance-way formed by the converging portions 9 at the front of the vehicle, and a similar pair of converging surfaces 10 are located at the rear of the vehicle to gather and discharge the vines while the vehicle travels, as will be understood.

The vehicle is mounted on the pair of wheels 11, journaled on the axle 12, after the manner of a cart; and a tongue 13, for the draft power, is connected to the crossbar 14 journaled in the sides of the frame, as shown in Figs. 1 and 3. A double-tree 15 is carried by the tongue 13, or any other type of draft gear may be employed. The vehicle body is adapted to be angularly adjusted on the axle 12, all in accordance with the nature of work engaged; and to secure this adjustment there is a pivoted arm 16 mounted on the tongue and carrying a pin 17 that may engage with any one of a series of apertures 18, as shown in Fig. 1.

The thrasher consists of a shaft 19, suitably journaled in the bracket 20 on the frame and bearing 21 on axle 12; and said shaft 19 is connected to be driven from the vehicle axle by a miter-gear 22, or any other suitable driving connection may be employed. A plurality of beaters, comprising arms 23, 24, and 25, are secured to said shaft at substantially equal distances apart; and the arms of the respective groups have upturned end portions and are of different lengths to the end that the thresher will hit the peas on the vines in three different locations, *i. e.* the vines will be subjected to uniform threshing and, as a result, the entire crop will be harvested.

The compartment or section 7 of the vehicle body has its outer side wall formed by a sheet of fabric 26, preferably canvas, to provide a light or soft surface against which the peas are thrown by the working arms. The harvested peas will gather at the rear end of the compartment, due to the tilting of the vehicle body, and the accumulation of peas may be readily removed by an opening, closed by a door 27, or in any preferred manner.

A screen 28 is hingedly mounted, as at 29, at the bottom of the compartment 7, and is adapted to be continually agitated, for screening the peas, from the axle 12. The agitating device consists of a bar 30 connected at its lower end to the screen 28 and having a looped end 31 embracing the axle 12. A pin 32, carried on said loop, is adapted to be intermittently engaged by the several projections 33 secured to the shaft, and in this manner the screen is intermittently lifted. The downward motion of the screen is accelerated by a spring 34, fixed at one end 35, and engaging with a pin 36 secured to the bar 30, as shown in Fig. 4.

It is proposed that the thresher be operated and the screen agitated only when the vehicle moves forwardly, and to this end the axle 12 is provided with clutches 37, tensioned by the springs 38; and said clutches have their teeth so disposed that only the forward progress of the vehicle will actuate the shaft 19, while the reverse movement will allow said shaft to remain still. And said clutches further give the necessary differential for operating the beaters when the vehicle is turning.

It is obvious that those skilled in the art may vary the details of construction and arrangement of parts without departing from the spirit of our invention, and we therefore do not wish to be limited to such features except as may be required by the claims.

Having thus fully described our said invention, what we claim as new and desire to secure by Letters Patent, is:

1. In a pea harvester, the combination of a wheeled vehicle, a shaft journaled on one side of the vehicle, a plurality of beaters successively and progressively varied in length and having up-turned end portions mounted on the shaft, means for guiding the pea vines into the path of the beaters, and a driving connection between the vehicle shaft and the beater shaft, substantially as set forth.

2. In a pea harvester, the combination of a wheeled vehicle, a shaft journaled on one side of the vehicle, a plurality of beater arms mounted on the shaft, a fabric sheet disposed opposite said beaters adapted to receive the peas thrown by the beaters, means for guiding the pea vines into the path of the beater, and a driving connection between the vehicle shaft and the beater shaft, substantially as set forth.

3. In a pea harvester, the combination of a wheeled vehicle, comprising two similar sections, a shaft journaled in one of said sections, a plurality of beater arms mounted on the shaft, a fabric sheet mounted in the other section and disposed opposite said beaters adapted to receive the peas thrown by the beaters, means for guiding the pea vines into the path of the beaters, and a driving connection between the vehicle shaft and the beater shaft, substantially as set forth.

4. In a pea harvester, the combination of a wheeled vehicle comprising a body constructed in two sections, providing a pathway therebetween through which the pea vines pass, a horizontally disposed shaft journaled in one of said sections, a plurality of beater arms of successive and progressive variation in length mounted on the shaft and extending over into the path way and adapted to beat the peas into said vehicle body sections, a fabric sheet disposed opposite said beaters adapted to receive the peas thrown by the beaters, and a driving connection between the vehicle shaft and the beater shaft, substantially as set forth.

5. In a pea harvester, the combination of a wheeled vehicle, comprising a body constructed in two sections providing a pathway through which the pea vines pass, said sections having converging portions at the front end of the vehicle to gather the pea vines, and a small pair of converging portions at the rear of said sections to gather and release the pea vines, a shaft journaled on one side of the vehicle, a plurality of beater arms mounted on the shaft, and a driving connection between the vehicle shaft and the beater shaft, substantially as set forth.

In witness whereof, we have hereunto set our hands and seals at Elizabeth City, North Carolina this 3rd day of March, A. D., nineteen hundred and seventeen.

FRANK V. SCOTT. [L. S.]
JOE D. HASKETT. [L. S.]

Witnesses:
W. H. JENNINGS,
C. H. TWIDDY.

Copies of this patent may be obtained for five cents each, by addressing the "Commissioner of Patents, Washington, D. C."